United States Patent [19]

Loyzim et al.

[11] Patent Number: 4,562,393
[45] Date of Patent: Dec. 31, 1985

[54] MODULATION SCHEME FOR PWM-TYPE AMPLIFIERS OR MOTORS

[75] Inventors: Robert J. Loyzim, Christiansburg; Michael P. Blythe, Sterling, both of Va.

[73] Assignee: Kollmorgen Technologies Corporation, Dallas, Tex.

[21] Appl. No.: 537,028

[22] Filed: Sep. 29, 1983

[51] Int. Cl.⁴ .............................................. G05B 11/28
[52] U.S. Cl. .................................. 318/599; 318/341; 318/317; 318/257
[58] Field of Search ............... 318/257, 254, 293, 317, 318/341, 439, 599, 345 B, 345 C

[56] References Cited

U.S. PATENT DOCUMENTS

| | | | |
|---|---|---|---|
| 3,260,912 | 7/1966 | Gregory | 318/341 |
| 3,525,029 | 8/1970 | Joslyn et al. | 318/599 |
| 3,824,440 | 7/1974 | McIntosh | 318/341 X |
| 4,006,391 | 2/1977 | Deering et al. | 318/227 |
| 4,020,361 | 4/1977 | Suelzle et al. | 318/599 X |
| 4,072,883 | 2/1978 | Beiter | 318/341 X |
| 4,288,730 | 9/1981 | Graham | 318/599 |
| 4,300,081 | 11/1981 | Van Landingham | 318/599 |
| 4,306,181 | 12/1981 | Welburn | 318/599 X |
| 4,368,411 | 1/1983 | Kidd | 318/254 |
| 4,454,573 | 6/1984 | Petsch et al. | 318/599 X |

FOREIGN PATENT DOCUMENTS 1513181  10/1969  Fed. Rep. of Germany ...... 318/293

Primary Examiner—B. Dobeck
Assistant Examiner—Shik L. P. Ip
Attorney, Agent, or Firm—Morgan, Finnegan, Pine, Foley & Lee

[57] ABSTRACT

In a motor control system for a DC motor, a modulation circuit provides a plurality of pulse width modulated signals to control the current applied to the motor. The motor is coupled to a current sensing resistor and a plurality of switches responsive to the pulse width modulated control signals. The output of the current sensing resistor is summed with an input current command to provide an error signal. A modulation circuit which includes a waveform generator generates a plurality of interposed triangular waves adjustably offset by a predetermined amount. The triangular waves are compared to the error signal to provide pulse width modulated control signals which cause a "dither" current to be applied to the motor when there is substantially no input command and currents having substantially decreasing form factors to be applied as the input command increases.

11 Claims, 7 Drawing Figures

MODULATION SCHEME FOR PWM-TYPE AMPLIFIERS OR MOTORS

BACKGROUND OF THE INVENTION

The present invention relates generally to pulse width modulated (PWM) amplifiers and more specifically to a servoamplifier for a DC electric servomotor.

To obtain optimum performance from a DC servomotor it should see current waveforms that contain only frequencies present in the command signal or load. Any additional AC signals especially those generated by the controller reduce the motor's maximum capability by generating extra heat within it. The heat is in the form of extra copper losses and extra iron losses. Copper losses resulting from extra AC components can be qualified by the form factor, i.e., the ratio of the RMS current to the average or torque producing current. Iron losses are more difficult to quantify since there are two varieties and their values do not always vary linearly with current or frequency. Iron losses, however, always increase with frequency and current. Conventional SCR amplifiers generally have poor form factors but inject only low frequency ripple components. Thus, the extra heating associated with SCR amplifiers is mainly in the form of copper losses.

PWM amplifiers, on the other hand, do tend to have better form factors but also operate at much higher frequencies. This tends to cause higher iron losses rather than higher copper losses. These losses are tolerated however, because the PWM amplifier provides greatly improved system bandwidth, better large signal transient response and tends to induce fewer machine reasonance problems.

A representative example of a pulse width modulated amplifier is disclosed in U.S. Pat. No. 4,368,411, entitled "Control System For Electric Motor", by H. Keith Kidd, issued Jan. 11, 1983. The Kidd patent discloses a four quadrant control system for a brushless DC motor wherein the windings are energized by pulse width modulated control signals applied to a switching circuit in a bridge configuration. A pulse width modulator provides the control signals in response to a comparison of a pair of triangular waves to an error signal. The pulse width modulator is capable of providing relatively high currents having good form factors to motor, but it is unable to provide a "dither" current.

Due to the relationship between the form factor and the magnitude of the average load current, it has often been found that better overall machine performance results when some AC signal is fed to the motor at standstill. This "dither" component prevents the higher stiction forces from coming into play yet does not appreciably increase overall motor heating since it occurs at low average current levels. Thus, it is desirable for a servoamplifier to have the capability of injecting a controlled amount of "dither" current into the motor at no load or light loads but to smoothly leave this mode and progress to a type of operation where the current contains no extra frequencies generated by the amplifier as the current becomes higher.

Copending U.S. patent application Ser. No. 472,216 entitled "Motor Control System With Load Current Recirculation", filed Mar. 4, 1983 discloses a bidirectional three-phase SCR motor control system which can provide a "dither" current at standstill. Such a three-phase SCR servoamplifier however, as mentioned above, has an inherently lower bandwidth, although it does provide the desirable decreasing form factors at higher current values.

Accordingly, there is a need for a servoamplifier which can provide the advantages of a recirculating load current SCR servoamplifier with the high bandwidth advantages of a PWM servoamplifier.

SUMMARY OF THE INVENTION

The apparatus of the present invention provides a pulse width modulated type servoamplifier for providing an inductive type DC load with a "dither" current at low current values and a current having a substantially decreasing form factors at higher current values.

The DC load is preferably a DC electric motor coupled to a plurality of switches in a bridge configuration. The switches are preferably transistors, which are responsive to pulse width modulation control signals. A current sensing resistor connected to the bridge circuit provides an indication of the actual current flowing through the DC motor. The output of current sensing resistor is a load current signal which is summed with a current command signal to provide an error signal. The load current signal and the error signal are used as inputs to a modulation circuit.

The modulation circuit includes a waveform generator which provides two pairs of interposed triangular waveforms which are offset from each other by predetermined amounts. Preferably the offset of the first pair of waveforms is adjustable in proportion to the magnitude of the load current signal and the second pair of waveforms have a fixed offset. The interposed waveforms are compared to the error signal to generate a plurality of pulse width modulated control signals useful in driving the switches of the bridge circuit.

DETAILED DESCRIPTION OF THE INVENTION

Figure 1:
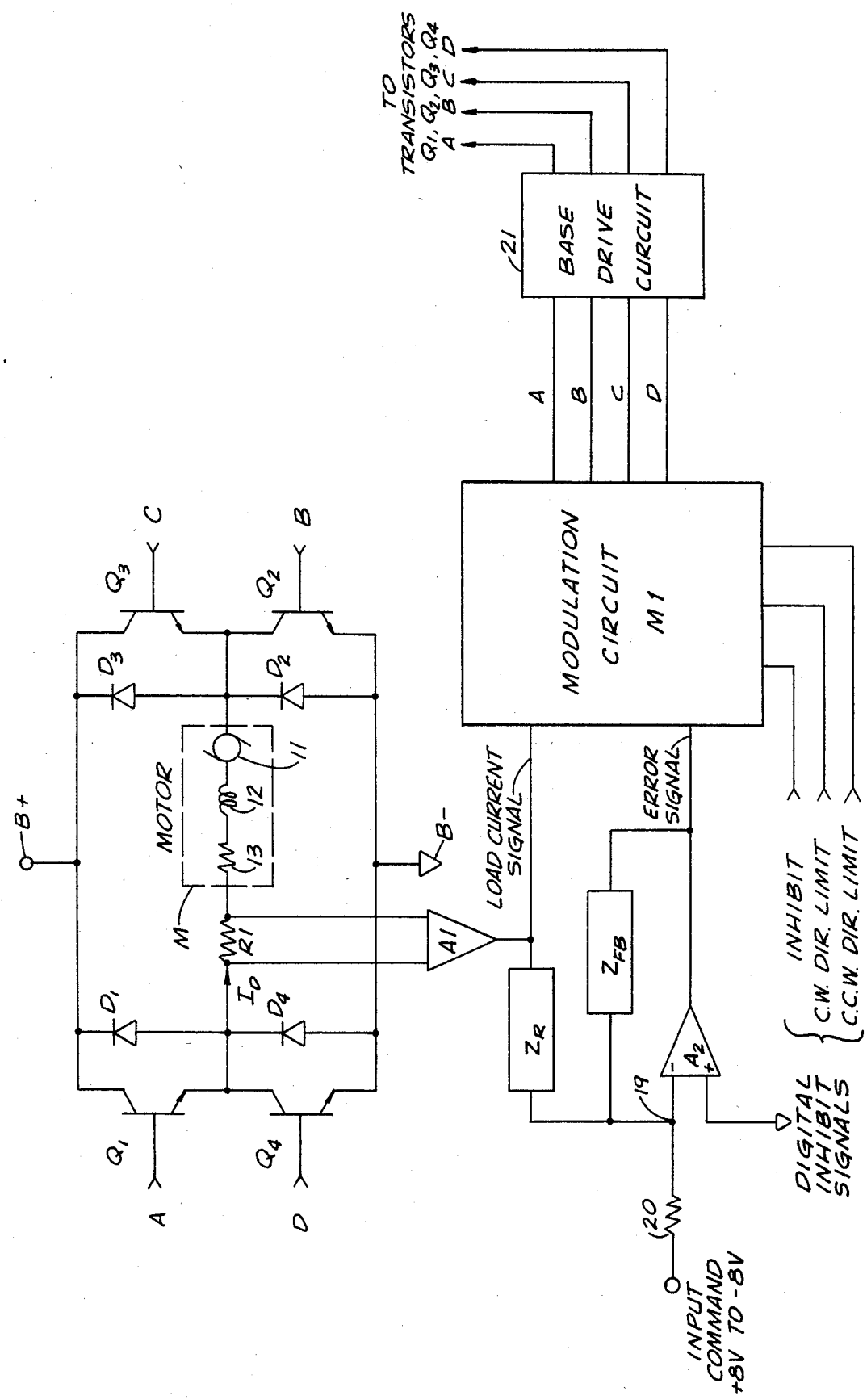
FIG. 1 is a block diagram of a motor control system which utilizes the apparatus of the present invention.

Referring now to FIG. 1, a block diagram illustrates a four quadrant motor control system utilizing the apparatus of the present invention. The motor M is illustrated schematically as being comprised of an ideal machine 11 coupled to an inductor 12 and a equivalent resistance 13. A full bridge comprised of transistors Q1, Q2, Q3, Q4 and diodes D1, D2, D3, D4 is connected between a DC bus B+ and ground B−. The transistors Q1, Q2, Q3, Q4 are preferably of the high power darlington type. A sensing resistor R1 is connected to the motor M to provide an indication of the actual load current flowing through the motor M.

An amplifier A1 has its input terminals connected to the current sensing resistor R1 to provide the load current or current feedback signal that is proportional to the current in the sensing resistors R1. The load current signal is applied to a modulation circuit M1 and a compensation circuit $Z_R$. A compensation feedback circuit designated $Z_{FB}$ is coupled between the output terminal and an input terminal of an amplifier A2.

An input command signal is applied to a resistor 20 and a voltage is developed which is applied as an input to the amplifier A2. A summing junction 19 at the input to the amplifier A2 sums the load current or current feedback signal from amplifier A1 with the voltage associated with the input command signal to provide an error signal. The error signal is applied to the modulation circuit M1 which is also responsive to the load current signal to generate a plurality of pulse width modulated (PWM) control signals A, B, C, D which are applied to the bases of transistors Q1, Q2, Q3, Q4 via a base drive circuit 21. The modulation circuit M1 is also responsive to a plurality of digital inhibit signals which are useful for inhibiting or limiting the directional rotation of the motor 10.

Figure 2:
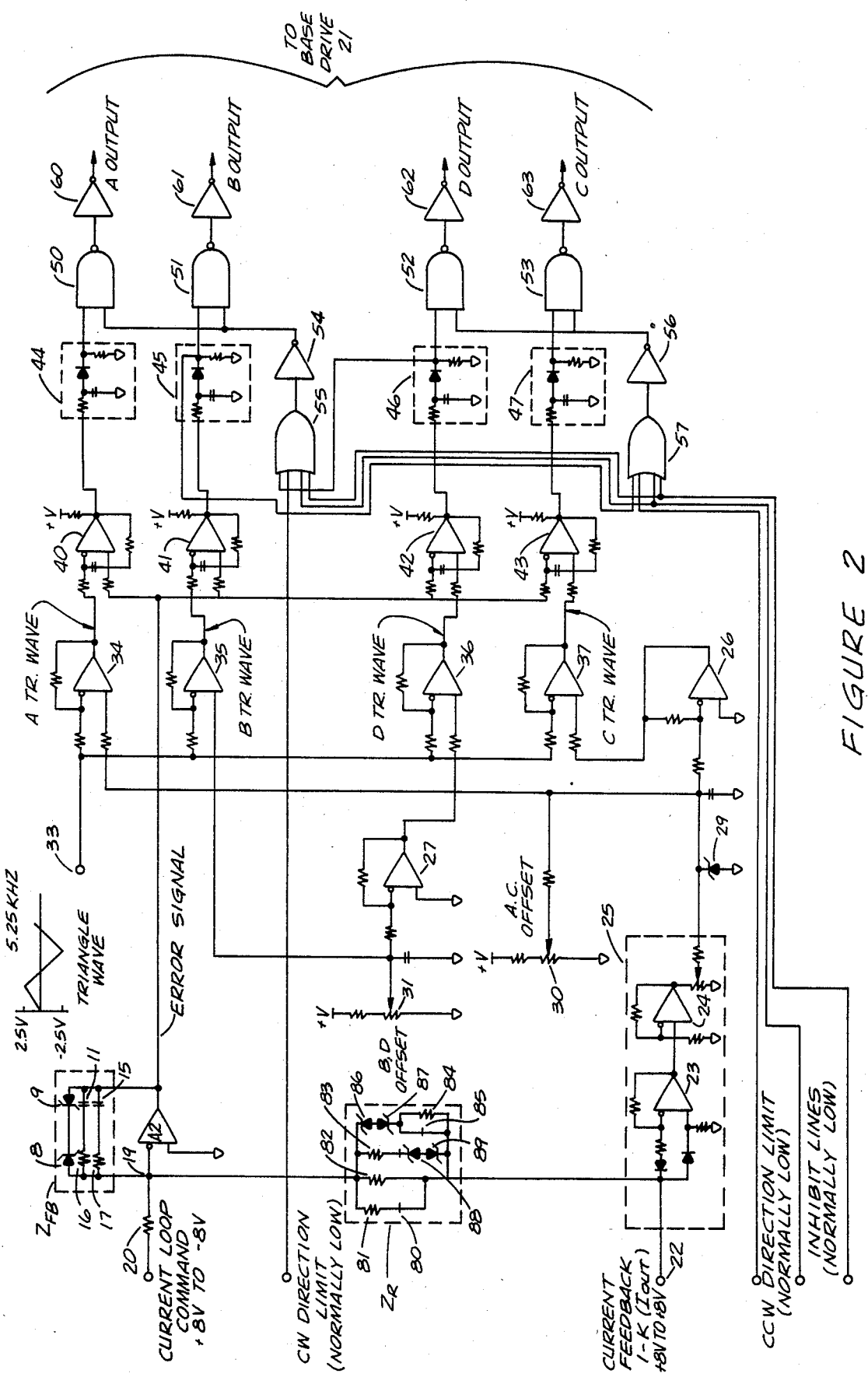
FIG. 2 is a schematic diagram of the modulation circuit shown in FIG. 1.

Referring now to FIG. 2, a schematic diagram illustrates the details of the modulation circuit M1. The modulation circuit M1 receives the load current or current feedback signal at the input terminal 22 and applies the signal to operational amplifiers 23, 24 which act as an absolute value circuit 25. The output of the absolute value circuit 25 is applied to the operational amplifier 26 which acts as inverter to provide a gain of −1. The inverter 26 has one input terminal connected to ground and one input terminal coupled to the absolute value circuit 25 and a variable resistor 30. An inverter 27 is coupled to a variable resistor 31 and ground.

The compensation circuit $Z_{FB}$ is illustrated as being comprised of zener diodes 8, 9 and capacitor 11, 15 and resistors 16, 17. The zener diodes 12, 13 limit the maximum swing of the error signal from the amplifier A2. The RC pairs 11, 16 and 15, 17 are linear feedback elements used for optimizing closed loop response.

The compensation circuit $Z_R$ is illustrated as including capacitor 80 and resistors 81, 82 which provide the linear feedback. The compensation circuit $Z_R$ also includes resistors 83, 84, capacitor 85, and zener diodes 86–89 which provide non-linear feedback since the gain of the circuit changes as a function of the feedback level.

A waveform generator preferably provides a triangle wave at input terminal 33 that is graphically illustrated as having an amplitude of five volts and a frequency of 5.25 Khz. The triangle wave is applied to a plurality of operational amplifiers 34, 35, 36, 37. The operational amplifiers 34, 35, 36, 37 are useful for shifting the d.c. offset of the amplitude of the triangle wave from the waveform generator in order to provide four different triangle waves which are hereinafter designated as triangle waves A, B, C, D.

The triangle waves A,B,C,D are illustrated in FIGS. 3, 4, 5, 6. The triangle waves A,B are shifed in a positive direction and triangle waves C,D are shifted in a negative direction with respect to triangle wave from the waveform generator. The amount of shift or d.c. offset of the applitude of triangle wave A is a function of the magnitude of the absolute value of the load current signal and the variable resistor 30. The amount of d.c. shift for triangle wave C is a function of the magnitude of the absolute value of the load current signal as well as the inverter 26 and the variable resistor 30. A zener diode 29 is coupled to the output terminal of the absolute value circuit 25 to limit the maximum amount that triangle waves A,C can be shifted. The amount of d.c shift for the triangle waves B, D is a function of the variable resistor 31, and the d.c. shift of triangle wave D is also a function of the inverter 27.

The triangle waves A, B, C, D are applied to elements 40, 41, 42, 43 which act as comparators. Preferably triangular waves B, D are fixed in their d.c. offset and smaller in magnitude than triangle waves A, C. Triangle waves A, C are larger in peak to peak amplitude and not fixed in their offset value. As hereinafter described triangle wave A, C are shifted out and away from a zero baseline by a signal proportioned to the absolute value of the load current. It should also be noted that instead of utilizing the pair of triangle waves B, D a single triangle wave could be utilized in their place. The preferred embodiment of the present invention, however, will be described herein as utilizing the pair of triangle waves B,D.

The comparators 40, 41, 42, 43 compare the triangle waves A, B, C, D to the error signal, to generate a plurality of digital waveforms. The digital waveforms are applied to time delay circuits 44, 45, 46, 47 which are comprised of a capacitor, a diode, and two resistors. The time delay circuits 44, 45, 46, 47 provide "slow on" and "fast off" control of transistors Q1, Q2, Q3, Q4. The output of the time delay circuits 44, 45, 46, 47 are applied as the first inputs to NAND gates 50, 51, 52, 53. The second inputs to NAND gates 50, 51 are the outputs of an inverter 54 and OR gate 55. The second inputs to NAND gates 52, 53 are the outputs of an inverter 56 and OR gate 57.

The logic gates 50–57 are responsive to directional limit signals and inhibit signals to prevent current from being applied to the motor, thereby preventing the motor from being rotated in a desired direction or preventing rotation altogether. The motor M, therefore, can be brought to a stop as it rotates in one direction and then allowed to rotate in the opposite direction. Such an arrangement is advantageous when the present invention is utilized in machine tool applications.

The outputs of NAND gates 50, 51, 52, 53 are applied to inverting buffers 60, 61, 62, 63 to provide logically correct digital waveforms A, B, C, D which are applied to transistors Q1, Q2, Q3, Q4 via the base drive circuit 21.

In operation, the digital waveforms A, B, C, D are used to control conduction paths through the bridge circuit associated with the motor M. The apparatus of the present invention provides a plurality of conduction paths through the bridge circuit which results in a "dither" current being applied to the motor M when there is no input command or a very low input command and a current having substantially decreasing form factors as the input command is increased.

Figure 3:
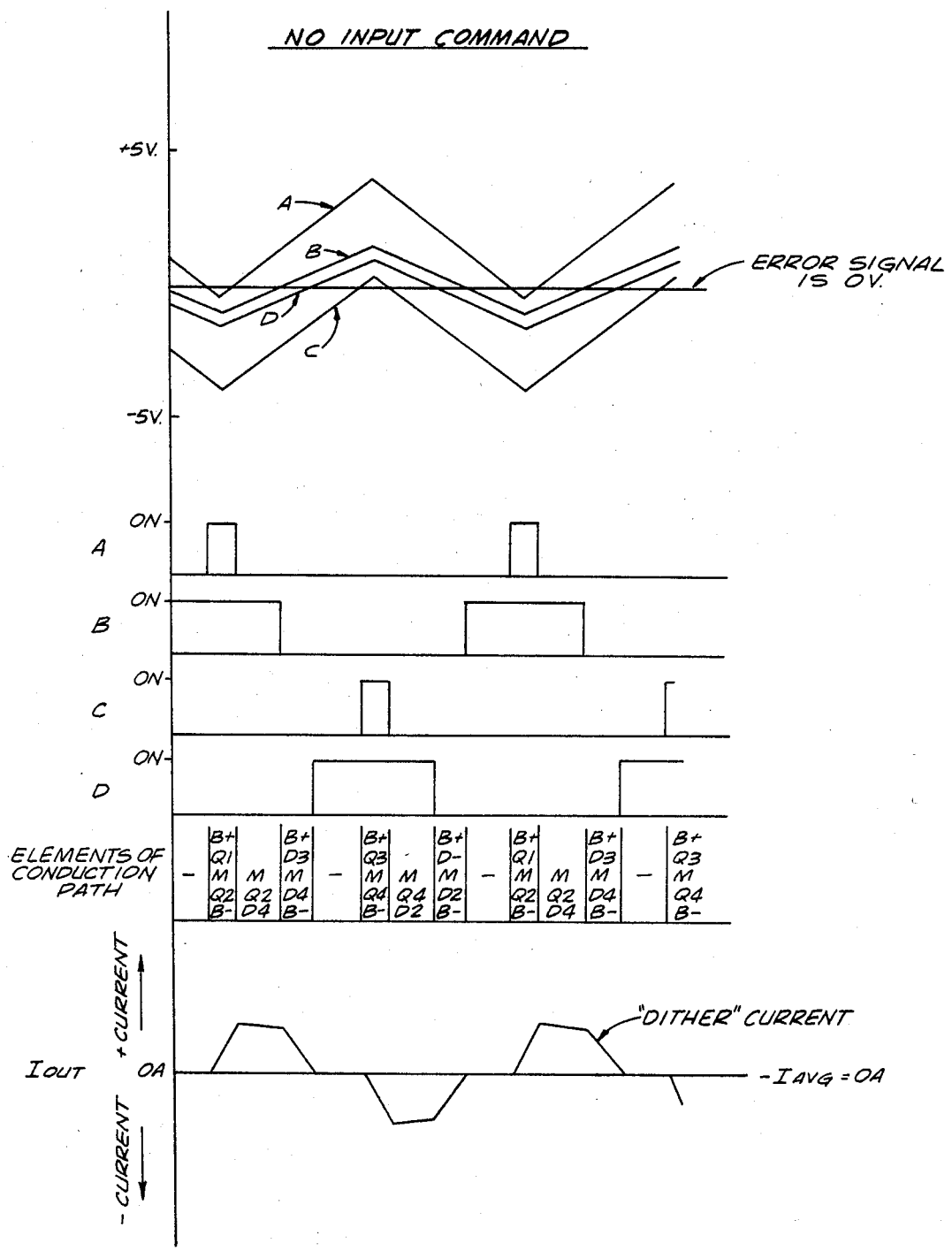
FIGS. 3, 4, 5, 6 are illustrations of waveforms and tables of circuit elements useful in explaining the operation of the present invention.

Referring now to FIG. 3, various waveforms associated with the absence of an input command are illustrated. The interposed triangular waveforms A, B, C, D represent the output of the operational amplifiers 34, 35, 36, 37 of FIG. 1 when there is substantially no input command applied to the input terminal 22. The amplitude of triangle waves A, C are offset from the baseline by a predetermined amount and the amplitudes of triangle waves B, D are offset from one another by a fixed amount. Initially the error signal has a value of 0 volts and coincides with the baseline. At this point in time, the inputs to the comparators 40, 41, 42, 43 include the triangular waveforms A, B, C, D and the 0 volt error signal. The comparators 40, 41, 42, 43 compare the triangular waves A, B, C, D to the error signal and generate the digital waveforms A, B, C, D which are transmitted through the time delay circuits 44, 45, 46, 47, the NAND gates 50, 51, 52, 53, the buffer amplifiers 60, 61, 62, 63, and the base drive circuit 21 to turn on transistors Q1, Q2, Q3, Q4.

The turning on of transistors Q1, Q2, Q3, Q4 cause different conduction paths in the bridge circuit associated with the motor M and result in a "dither" current having an average of 0 amperes. It should be noted, however, that the pair of transistors Q1 and Q4 as well as the pair Q2 and Q3 should never be turned on simultaneously since this will cause a "shootthrough" connecting the d.c. bus B+ to ground B−, thereby damaging the transistors. The time delay circuit 44, 45, 46, 47 as well as the logic gates 50-57 are useful in preventing "shootthrough" by prohibiting the transistor pairs from turning on simultaneously.

The elements of the conduction path necessary to generate the "dither" current of FIG. 3 are listed in the table directly below the digital waveforms A, B, C, D. For example, initially digital waveforms A, B turn on transistors Q1 and Q2, thereby providing a conduction path from the bus B+ through the transistor Q1, the motor M, the transistor Q2, and ground B−. When the digital waveform A turns off transistor Q1, a second conduction path through the bridge circuit is established. The second conduction path takes the energy stored in the inductor 12 and causes it to "recirculate" through the motor M, the transistor Q2 and the diode D4. When digital waveform B turns off transistor Q2, a third conduction path is established from the bus B+, through the diode D3, the motor M, the diode D4, and ground B−, thereby returning energy stored in the inductor 12 to the bus B+. It can be appreciated that the first three conduction paths generate the positive half cycle of the "dither" current. The negative half cycle of the "dither" current is generated by the next three conduction paths summarized in the tables directly above the negative half cycle. These six conduction paths are repeated sequentially as long as there is substantially no input commmand.

Figure 4:
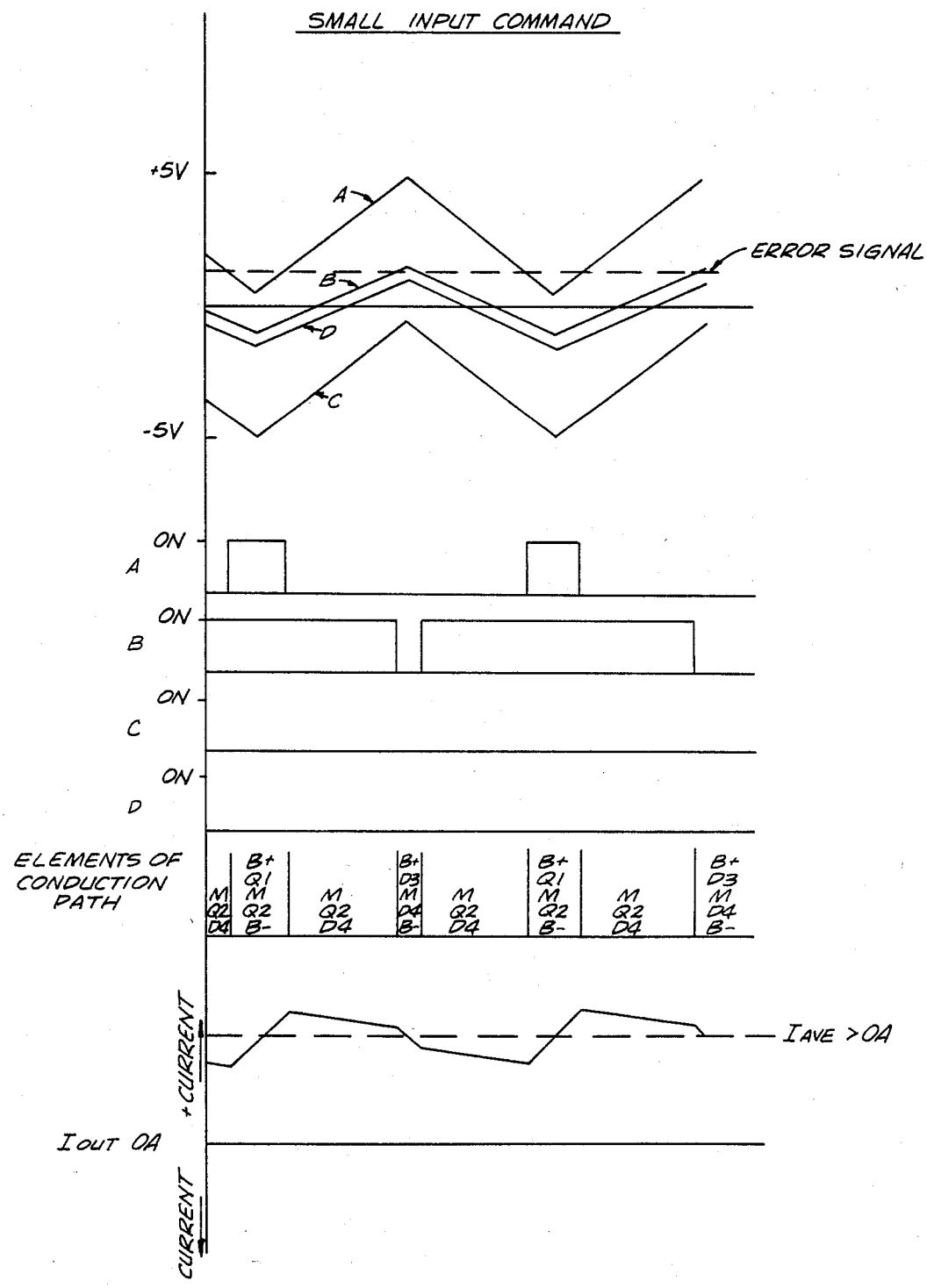

Referring now to FIG. 4, the waveforms associated with a small input command are illustrated. In FIG. 4, the error signal is no longer at the zero baseline and the operational amplifiers 34, 37 have shifted the d.c. offset of triangle waves A, C in response to the absolute value of the load current. The triangle waves B, D have not been shifted. This progressive shifting of the two triangle waves A, C which are responsible for the motoring pulses permits a smooth transition from a "dither" mode to a "lock-up" mode in which the current $I_{avg.}$ reaches a desired substantially d.c. level that is typically one third the maximum current. When the current input command is relatively small there are no digital waveforms C, D and transistors Q3, Q4 are turned off. Transistors Q1, Q2, however, are pulsed on and off by digital waveforms A, B to cause the different conduction paths, listed in the tables directly below the digital waveforms, to generate a relatively small current $I_{avg.}$ which is greater than 0 amperes.

Figure 5:
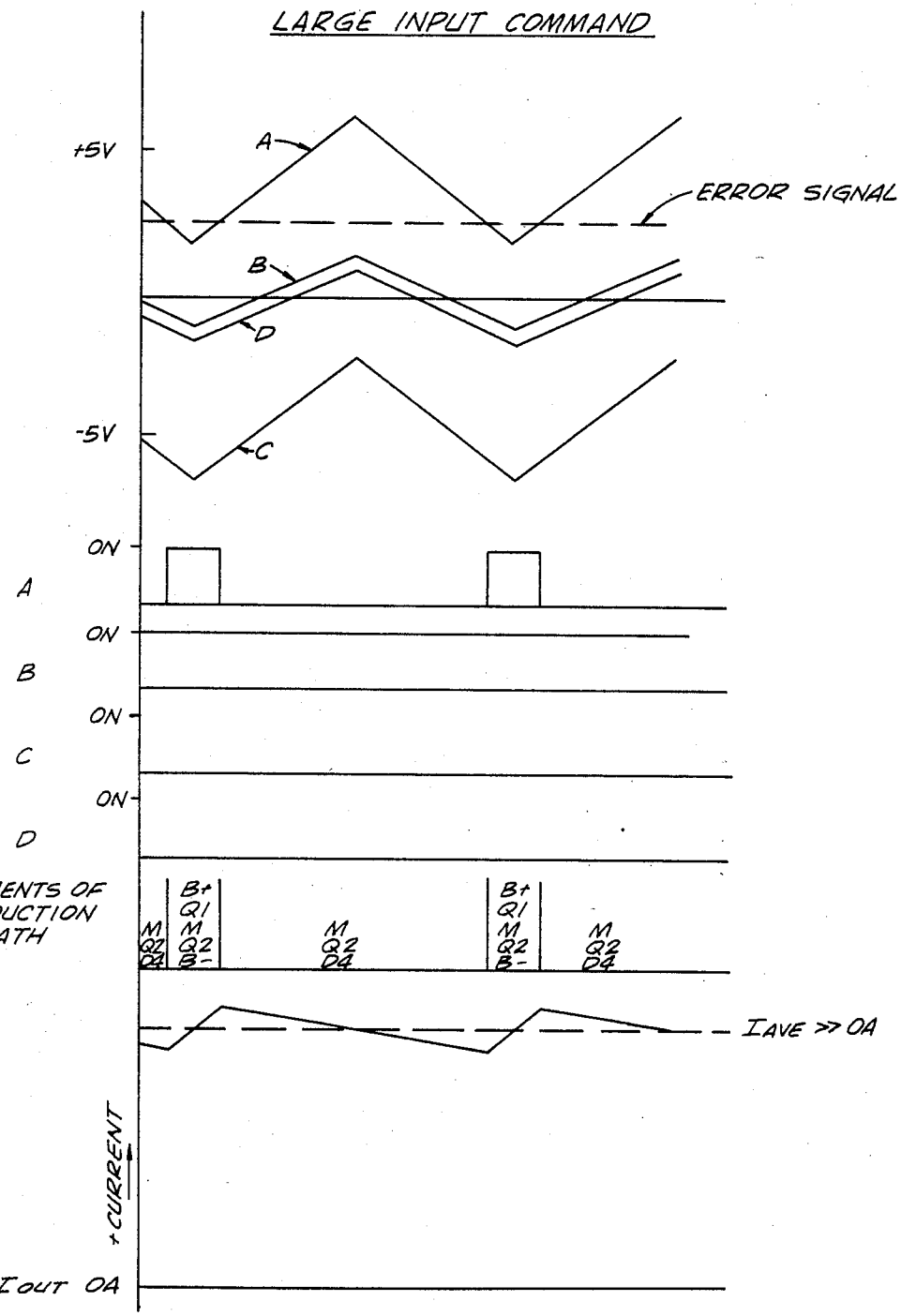

Referring now to FIG. 5, the waveforms associated with a large input command are illustrated. In FIG. 5, the error signal has shifted farther away from the zero baseline. The triangular waveforms A, C, have also been shifted further apart than in the case of the small input command, but the triangular waveforms B, D have not been shifted. The transistors Q3, Q4 remain turned off Q2 is always conducting and only transistor Q1 is pulsed on and off by digital waveform A to provide the different conduction paths listed in the tables directly below the digital waveforms. It should be noted that as $I_{avg.}$ increases it becomes a substantially d.c. current that has a decreasing form factor which improves the performance of the motor M by reducing the amount of heat within the motor.

Figure 6:
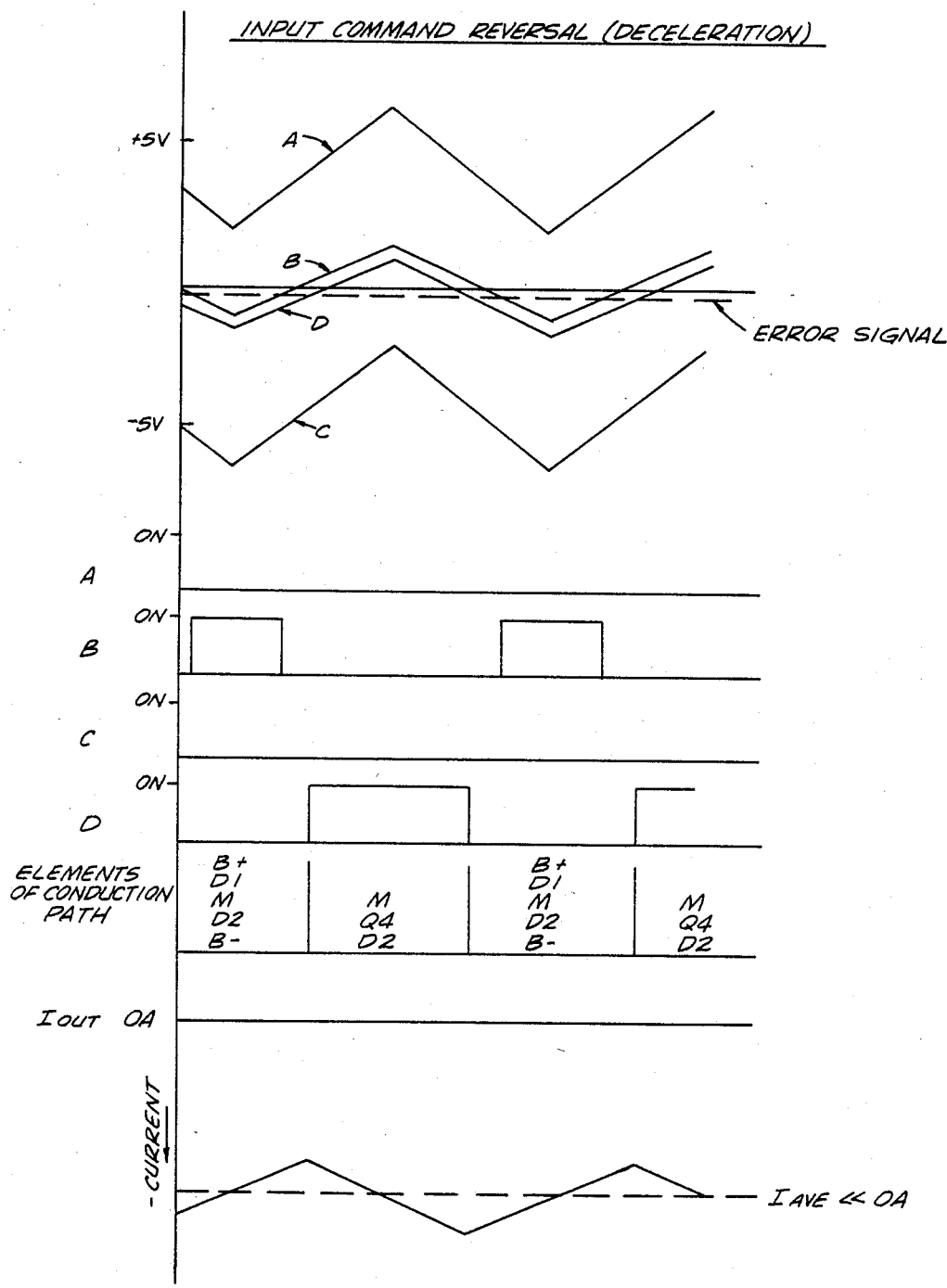

Referring now to FIG. 6, the waveforms associated an input reversal command which causes the motor M to decelerate are illustrated. The error signal now has a negative value. The transistors Q1, Q3 are turned off and only the transistors Q2, Q4 are pulsed on and off by digital waveforms B, D to generate the conduction paths listed in the tables listed directly below the digital waveforms. It should be noted that when the $I_{avg.}$ waveform has a positive slope, energy is being returned to the bus B+, since the motor M is in a regeneration mode of operation.

Figure 7:
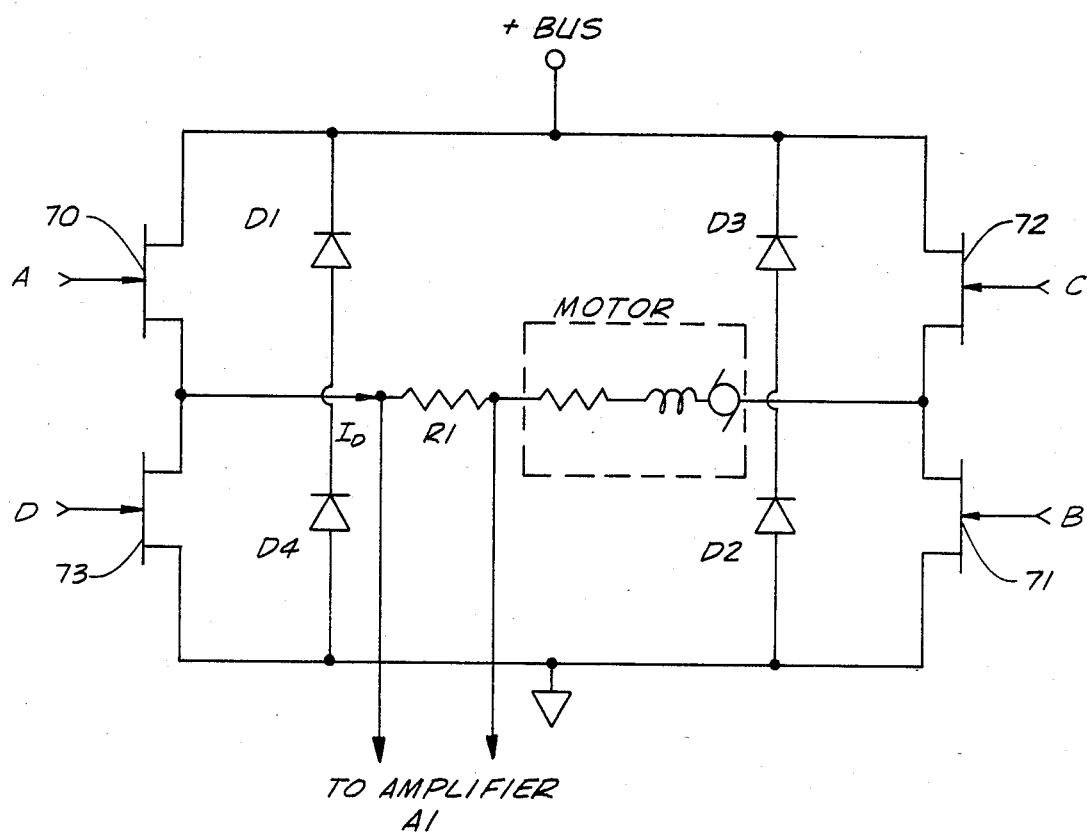
FIG. 7 is an alternate embodiment of the bridge circuit illustrated in FIG. 1.

Referring now to FIG. 7 an alternate embodiment of the bridge circuit associated with the motor M is illustrated. The bipolar NPN transistors of FIG. 1 have been replaced by field effect transistors (FET's) 70, 71, 72, 73. The gates of the FET's 70, 71, 72, 73 are responsive to the digital waveforms A, B, C, D in the same fashion as the bases of transistors Q1, Q2, Q3, Q4.

While the invention has been described in its preferred embodiments it is to be understood that the words which have been used are words of description rather than limitation and that changes may be made within the purview of the appended claims without departing from the true scope and spirit of the invention in its broader aspects.

What is claimed is:

1. A system for energizing a DC load, which comprises:
 a load circuit including the load, said load circuit being inductive and having a plurality of switches responsive to pulse width modulated control signals for applying a current to the load;
 means for generating at least a first pair of triangular waves, said first pair of triangular waves being adjustably offset from a baseline and each other by an amount proportional to the absolute value of the load current;
 means for generating at least one triangular wave which is interposed between said first pair of triangular waves and which has a fixed offset from the baseline;
 means for comparing the triangular waves to a signal indicative of the difference between a desired current and the actual load current, thereby generating pulse width modulated control signals which apply a dithered current to the load when the desired current is relatively low and a current having a substantially decreasing form factor as the desired current is increased.

2. The system according to claim 1 wherein said load is a DC motor and providing the inductance of said inductive load.

3. The system according to claim 2 wherein said load is a DC motor and said load circuit includes a separate inductor.

4. The system according to claim 1 wherein said means for generating at least one triangular wave generates two triangular waves having a fixed offset.

5. The system according to claim 4 wherein the comparator means includes time delay means for preventing the pulse width modulated control signals from simultaneously turning on switches of said load circuit which are coupled between a power supply and ground.

6. The system according to claim 5 which further includes logic means for inhibiting the flow of current.

7. The system according to claim 6 wherein the load circuit includes a DC motor connected to the switches in a bridge circuit configuration.

8. The system according to claim 7 wherein the load circuit further includes a current sensing resistor for providing a signal representative of the actual load current.

9. The system according to claim 8 which further includes a summing junction for comparing the actual load current signal to the desired current signal, thereby providing an error signal representative of the difference therebetween.

10. The system according to claim 1 wherein the load circuit includes a DC motor connected to bipolar transistors in a bridge circuit configuration.

11. The system according to claim 1 wherein the load circuit includes a DC motor connected to field effect transistors in a bridge circuit configuration.

* * * * *